US006496219B1

(12) United States Patent
Porret et al.

(10) Patent No.: US 6,496,219 B1
(45) Date of Patent: Dec. 17, 2002

(54) AUTOMATIC SYSTEM FOR DETECTING PRINTING FAULTS ON METALLIZED STRIPS OR ANY OTHER PRINTING SUPPORT COMPRISING A PREDOMINANCE OF SPECULAR COLOR SURFACES

(75) Inventors: Olivier Porret, Villars-Lussery (CH); Claude Toma, Crissier (CH)

(73) Assignee: Bobst S.A. (CH)

( * ) Notice: Subject to any disclaimer, the term of this patent is extended or adjusted under 35 U.S.C. 154(b) by 0 days.

(21) Appl. No.: 09/388,985

(22) Filed: Sep. 2, 1999

(30) Foreign Application Priority Data

Sep. 2, 1998 (CH) ..................................... 19981788/98

(51) Int. Cl.[7] ................................................ H04N 7/18

(52) U.S. Cl. ......................... 348/88; 348/132; 356/431; 382/141

(58) Field of Search ................................ 348/131, 132, 348/125, 88; 382/141; 356/429, 430, 431, 178

(56) References Cited

U.S. PATENT DOCUMENTS

| | | | | |
|---|---|---|---|---|
| 4,003,660 A | | 1/1977 | Christie, Jr. et al. | 356/178 |
| 5,018,213 A | * | 5/1991 | Sikes | 382/8 |
| 5,724,093 A | * | 3/1998 | Parenti | 348/131 |
| 5,790,186 A | * | 8/1998 | Tenny | 348/88 |
| 5,969,373 A | * | 10/1999 | Harris | 250/559.42 |
| 5,990,468 A | * | 11/1999 | Cornuejols | 250/208.1 |
| 5,999,636 A | * | 12/1999 | Juang | 382/112 |
| 6,211,905 B1 | * | 4/2001 | Rudt | 348/88 |

FOREIGN PATENT DOCUMENTS

| | | | |
|---|---|---|---|
| WO | 9500337 | 1/1995 | B41F/33/00 |

* cited by examiner

*Primary Examiner*—Chris Kelley
*Assistant Examiner*—Charles Parsons
(74) *Attorney, Agent, or Firm*—Ostrolenk, Faber, Gerb & Soffen, LLP

(57) ABSTRACT

This automatic system (1) detects printing faults on metallized strips (3) or any other printing support comprising a predominance of specular color surfaces. The said system, arranged in a blackout casing (2), comprises an arm (30) on which there can move automatically a lighting unit (10) provided with a video camera (55). The camera has a variable-focus lens (56) which, through a semi-transparent filter (57) disposed in an oblique position in front of the lens, continuously films a portion of the strip (3) of a format (7) of variable size. The illumination of this strip portion is provided by two direct-illumination flashlights (12, 14), provided primarily to illuminate the non-specular surfaces of the strip, and by two other indirect-illumination flashlights (11, 13), advantageously provided to illuminate the specular color surfaces. One of the two flashlights (11, 13) comprises a translucent flat diffuser (27) disposed on its leading front surface and oriented preferentially in the direction of the semi-transparent filter (57), while the other flashlight (11) is oriented in the direction of the surface of a concave and opaque diffuser (25). Enclosing the semi-transparent filter (57), the diffuser (25) is mounted at its center on a sleeve (26) which provides the mechanical and optical connection between the diffuser (25) and the lens (56) of the camera (55).

10 Claims, 5 Drawing Sheets

AUTOMATIC SYSTEM FOR DETECTING PRINTING FAULTS ON METALLIZED STRIPS OR ANY OTHER PRINTING SUPPORT COMPRISING A PREDOMINANCE OF SPECULAR COLOR SURFACES

This invention relates to a system for automatically detecting in a rotary printing press incipient printing faults on a metallised packaging strip, such as aluminised film, or any other substrate having a high reflecting power.

Frequently used in the packaging industry for printing strips fed from a reel, machines of this kind comprise a plurality of constituent stations, namely, progressing logically from upstream to downstream with reference to the direction of movement of the strip, a feed station comprising a reel holder and an automatic strip connector followed by a strip accumulator as required for each connection, an introduction station comprising a strip straightener and guide, a sequence of one or more printing units provided with dryers, and finally a reel receiving station or, if required, a station which directly introduces the printed strip into a new machine enabling it to be cut either by rotary working or flat working.

The automatic printing fault detection system will be used after this latter unit. Each of the printing units can give rise to different faults which may be in the form of streaks, smudges or blotches, variations in print intensity, print holes, or poor register in the case of a fault due to a shift between the different printing colours.

Numerous display and/or detection systems for these faults do exist in the prior art and generally use a video camera or any other means of picking up the light reflected by the printed strip. However, all these systems are intended primarily for monitoring non-specular colour prints on matt supports which have no particular brightness capable of reflecting the light in a given direction. It is therefore advantageous to differentiate the printing supports and inks designated as matt, in which it is not possible for any image to be reflected, from the metallised printing inks and supports whose reflecting power is associated with the aluminium foils typically used for perishable foods.

When a beam of light illuminates a non-reflecting surface termed matt, the light which is returned by this surface is a diffuse light which is reflected in every direction. On the other hand, if this surface is that of a metallised strip, the incident beam of light will be reflected as in a mirror in a given direction, at an angle of reflection equal to the angle of incidence of the beam. The difficulties that are found when monitoring a metallised strip depend essentially on the actual nature of the strip which has a specular and non-diffusing reflecting property. The subsequent problem in respect of optics or lighting and the sensing, by a camera, of the light reflected by the strip, form the subject of this invention inter alia. To obtain a good image quality, either with good colour rendering or a faithful image of the printed pattern, and avoid any problems in respect of deformation, lack of clarity and non-uniformity of the luminous flux sensed at the surface of its field of view, the camera is advantageously placed along a photographing axis oriented perpendicularly to the plane of the metallised strip. Since the illumination of a metallised strip can be likened to illumination of a mirror, the arrangement of a camera opposite said strip will naturally have the effect of giving rise to reflection of the image of the camera by the metallised strip. Although the camera may for the major part be hidden behind an opaque mask, the camera lens cannot be masked similarly in any case whatsoever. The geometric configuration of the camera lens with respect to the plane of the metallised strip is such that, in view of the specular properties of the strip, the camera can only relentlessly film the image of its own lens. Since the latter is directly connected to the camera photographic chamber, it follows that a black disc having a contour of varying definition depending on the quality of the reflection of the metallised strip will permanently appear at the centre of the image given by the camera. In order that the rays of light reflected by the metallised strip may traverse the lens of the camera in accordance with such a configuration, said rays must originate from a light source disposed on the same axis as the camera lens by virtue of the law of reflection which states equality between the angle of reflection and the angle of incidence of a ray of light. If that is not the case, the rays of light will not traverse the camera lens, and will therefore give rise to a darkened image of the strip on which the metallised surfaces will appear as surfaces of a substantially black tint. This blanking out of the image of the metallised parts of the strip, which is quite specific to such materials or inks having a predominance of specular colours, means that it is no longer possible to exclude any printing fault over the entire monitored surface.

To obviate this problem, various known systems making up the prior art provide a solution, depending on specific needs, to the problems of shade or reflection caused by illumination of strips subject to print or sealing quality control in a specific case.

For this purpose, the patent JP 9 300 596 describes a lighting system enabling a strip of any substrate to be inspected and printing faults to be detected. The system in question comprises a fixed lighting comprising three light tubes disposed opposite the front side of the vertically moving strip, and a light tube which detects the print holes by illuminating the back of the strip. Opposite the strip, two or three lights are disposed symmetrically on either side of its perpendicular and illuminate at an angle of 55° with respect to its surface. These two lights contribute an illumination intended to be reflected by all the diffusing surfaces. The beam of light from the third light is in turn intended to be reflected by specular surfaces. Its inclination with respect to the perpendicular to the strip is 8°. A camera situated opposite the strip standing back from the light fittings films the strip at an angle of the same value so that the reflection of the latter beam traverses the camera lens if it is reflected by a specular surface. Also, the inclined plane defined by the lamp for the front of the strip is such that it includes the axis of the camera lens. The four light tubes operate simultaneously and their lighting power is individually determined and monitored by an electronic monitor.

Another system is given by the patent EP 781 655, in which the inventor proposes apparatus and a method whereby during optical quality monitoring it is possible to reduce the shade effects which typically form on a strip formed by a transparent support moving horizontally above a surface having a diffusing opaque background. Comprising in particular transparent parts and opaque parts, said strip is illuminated on its front surface by an oblique parallel beam of light. The oblique arrangement of the beam is necessary in view of the position of a camera situated opposite the front surface of the strip on an axis perpendicular to the latter. In order to avoid static electricity problems as a result of friction of the strip on the opaque background surface, an indispensable gap separates the moving strip from the background surface. Since the lighting beam incidence to the printed strip is not perpendicular, a shade zone of triangular section proportional to the height of the gap and to the value of the angle of inclination of the incident beam inevitably forms in the gap and around all the opaque surfaces of the strip. To meet this problem, the inventor proposes that the opaque background surface should be replaced by a support consisting of a plurality of layers of a material which diffuses and reflects the light by cascade from one layer to the next. In this way there is created, in depth in each of the layers of said support, a better distribution of the light in every direction contributing to eliminate or attenuate the unwanted shade effect.

The patent JP 4 071 849 describes an optical detector designed for inspection of printed strips, including those having surfaces with a high reflecting power. Moving horizontally, the strip is illuminated obliquely on its front surface by a light tube. The light reflected by the strip is returned in the direction of a plurality of sensors disposed in line above the examined surface. In front of each of these sensors is a dissector polarising filter which allows extraction, from the beam reflected by the strip, of all the rays which have undergone specular reflection, i.e., all the rays whose angle of incidence is equal to the angle of reflection. Thus monitoring of the patterns printed on the strip is determined solely by the processing of a beam of a light entirely diffused by the surface thereof.

The patent JP 4 203 955 presents another variant for examination of a printed strip, which eliminates all the interference due to unwanted specular reflection. This method is based on converting an analogue signal proportional to the luminous intensity of a light reflected by the strip, into a binary signal coding for the examined image portion. Since the rays reflected as a result of specular reflection have a higher luminosity than those which have been diffused by the strip, it is then possible to differentiate these latter rays from the former by establishing an intensity threshold which limits the sensed analogue signals.

The patent JP 3 255 346, by monitoring an aluminised strip formed in this case by a packaging for pharmaceutical tablets, solves an optical problem of detecting faults in sealing a metallised strip on circular cavities containing pharmaceutical pills. The system in question has the feature of being able to detect faults without being affected by the wave-form corrugation on the aluminised back of each of said trays of tablets, following the normal production process used. Moving horizontally, the aluminised back faces a lamp which illuminates said surface obliquely, the strip reflects the incident rays with an irregular intensity depending on the distribution of the waves on its surface. The image of the luminous intensity of such a surface without any fault is previously stored and taken as a model by an electronic monitor. The rays reflected by the metallised strip are projected on to a horizontal translucent diffuser screen behind which the lens of a camera is situated. Obtained by transparency through the screen, the image given by the camera is compared by the electronic monitor with that which was taken as reference. Thus any fault in the sealing of the metallised strip on the cavities gives rise to a local luminous intensity different from that of the model, and allows damage to be detected in the sealing of the packaging under examination.

Due mainly to the diversification of the applications or objects to which these systems relate, the systems nevertheless give rise to a number of disadvantages which are, inter alia:

- lack of specular and diffusing colour rendering and fidelity for an objective comparison,
- the fact that in all the systems which do not differentiate between the illumination of the diffusing surfaces and the illumination of the specular surfaces, there will inevitably be, between these two types of surfaces, an imbalance in luminosity resulting in over-intensity of the metallised colours to the detriment of the contrast of the diffusing colours,
- the use of an oblique illumination for monitoring the reflecting surfaces, and this involves a double disadvantage, namely: a greatly reduced extent of the field of view of the camera because of the fineness of the beam of light which can traverse the lens after specular reflection, and a distortion of the image given by the camera because its photographing axis is oblique to the perpendicular to the monitored surface,
- the fundamental impossibility—in view of the objective to which the subject matter of this invention relates—of having access to a process intended to eliminate all the beams directly reflected by the examined surface and which have not undergone any diffusion by the same,
- the fact that certain systems are ineffective for processing transparent or translucent strips although they contain metallised surfaces,
- the use of a detection method which is poorly adapted, if at all, to the detection of printing faults on flat metallised strips of various colours without any particular corrugation.

The object of the system according to the invention is to obviate these disadvantages by providing a rapid tool of high performance in detecting all kinds of faults both during quality control in respect of the production of strips having a predominance of specular colours and those which have matt impressions. Of course this system also enables mixed strips to be processed, such strips partly comprising metallised surfaces or surfaces having a high reflecting power, and partly surfaces of diffusing colours. One of the features of this system is to improve the visual appearance of the reflecting surfaces filmed by a camera so that on the one hand the latter do not appear as being black or greatly faded zones in which any faults cannot be made visible, and on the other hand so that all the diffusing surfaces, even the dark ones, printed on an aluminised substrate, can be perfectly distinguished on a video monitor screen. It is by applying these specific features that it is possible to automate the detection process without any fear of blanking out—or certain darkening—of the system which would immediately result in a considerable reduction of the reliability of the detection system in view of the impossibility of being able to detect numerous faults which have already been qualified as inadmissible.

While inter alia allowing monitoring of the texture of metallised surfaces thanks to the detection of faults which may range down to a minimum size less than 0.1 mm, depending on the camera characteristics, the system according to this invention has the advantage of being able to detect in real time incipient faults on all the reflecting or diffusing surfaces during printing of the strip. In this way it is possible to detect at a very early stage and automatically any printing fault which may assume unacceptable dimensional proportions at varying speed, thus avoiding certain and considerable wastage in production. Finally it should be noted that irrespective of the choice of strip used, this system also equally well enables detection of clear and contrasted faults which are readily visible to the naked eye once located, and faults which are distinctly less marked, which merge into their surroundings due to a certain blurring or camouflage imparted by colours of relatively low contrast.

To this end, the invention relates to an automatic printing fault detection system suitable inter alia for monitoring metallised strips and in accordance with the text of claim 1.

In order to define some of the terms introduced into this description to describe the position of some elements within the printing machine, we would refer to the terms "operator side" (C.C.) and "side remote from the operator" (C.O.C.) which are used by agreement to refer to a side designated with respect to the central longitudinal axis of the machine. This choice prevents any confusion with the conventional left-hand and right-hand denominations, which depend on the point of view of the observer.

The invention will be more readily understood from one embodiment taken purely by way of example without limiting force and illustrated in the accompanying drawings wherein.

Figure 1:
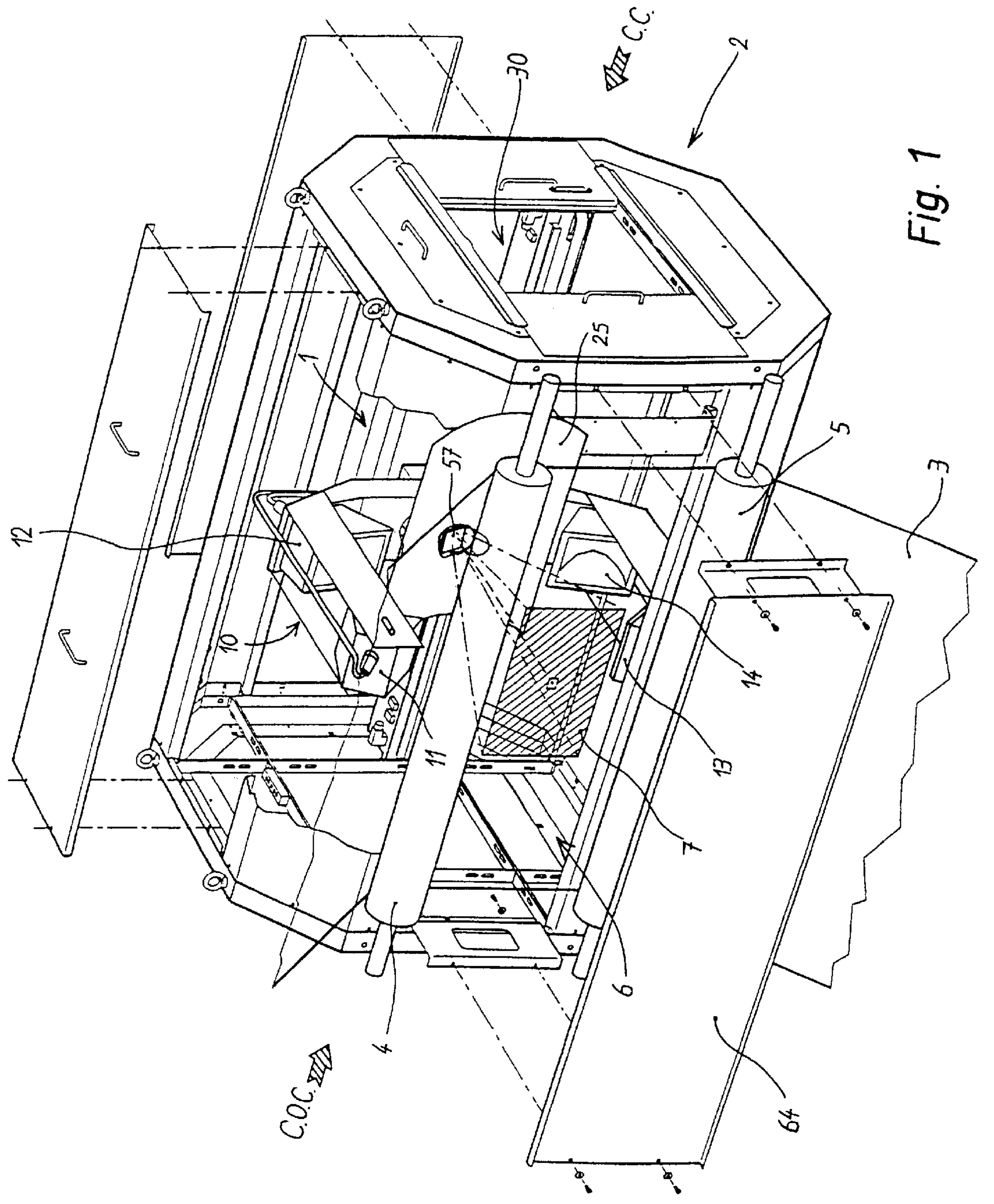
FIG. 1 is a perspective view of the printing fault detection system arranged in a casing situated opposite the strip being monitored.

FIG. 1 is a general view of the printing fault detection device 1 mounted in a casing 2 which acts as a darkroom for the device 1 and as a modular box the whole of which can form an option which is readily integrated in any printing machine. As shown in this Figure, the casing 2 is disposed opposite the metallised strip 3 which in this case is illustrated transparently. After leaving the last printing unit of the rotary press, this strip passes over two rollers 4 and 5 disposed opposite a wide window 6 opening into the casing. The size of this rectangular window is such that its width is larger than the largest width of the strip, and its height is less than the between-centres distance of the two rollers 4 and 5 but at least equal to the maximum height of the required monitoring format 7. The latter is illustrated in the Figure by cross-hatching.

Figure 2:
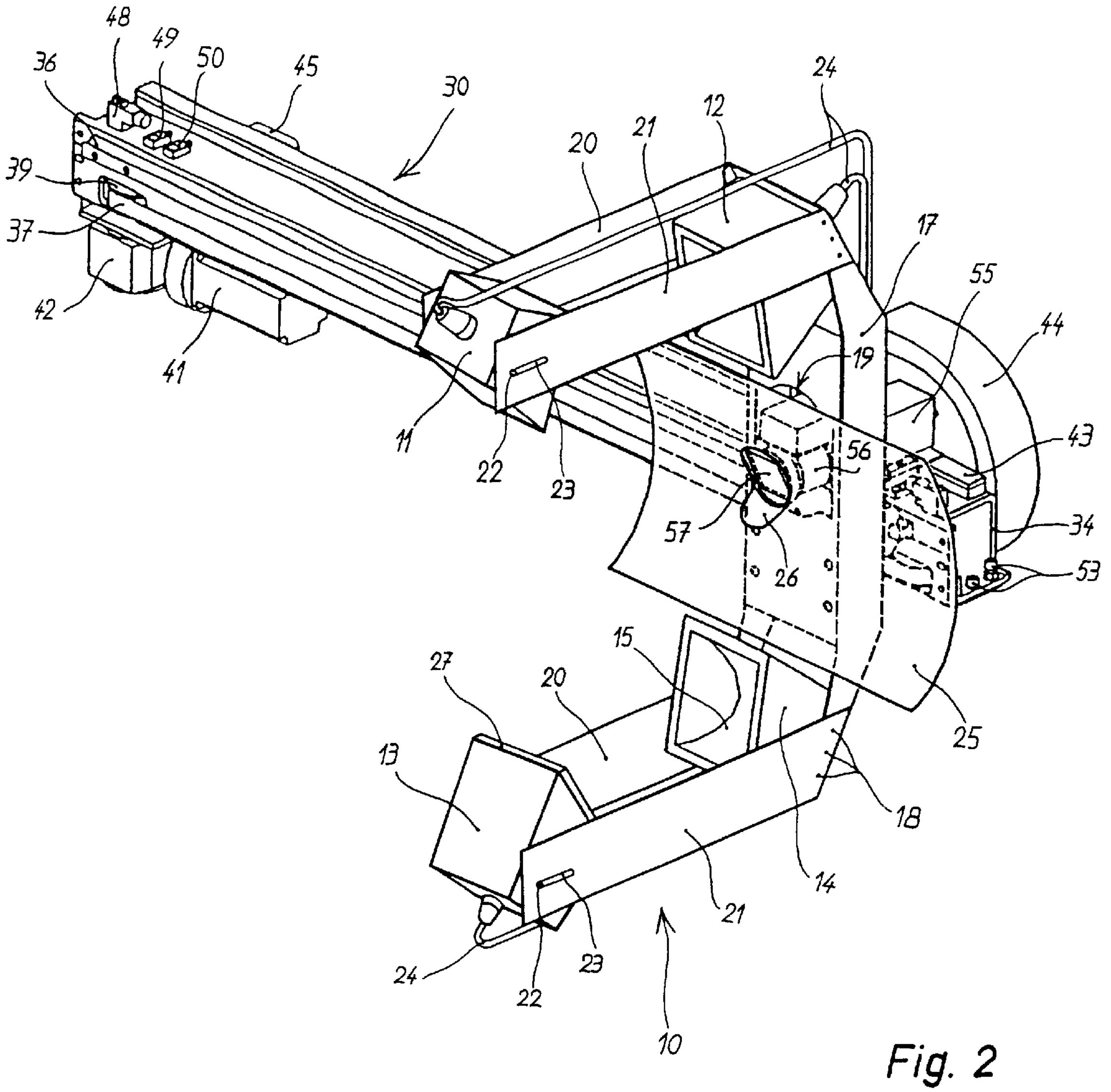
FIGS. 2 and 3 illustrate the detection system removed from the casing in front and back perspective views respectively.
Figure 3:
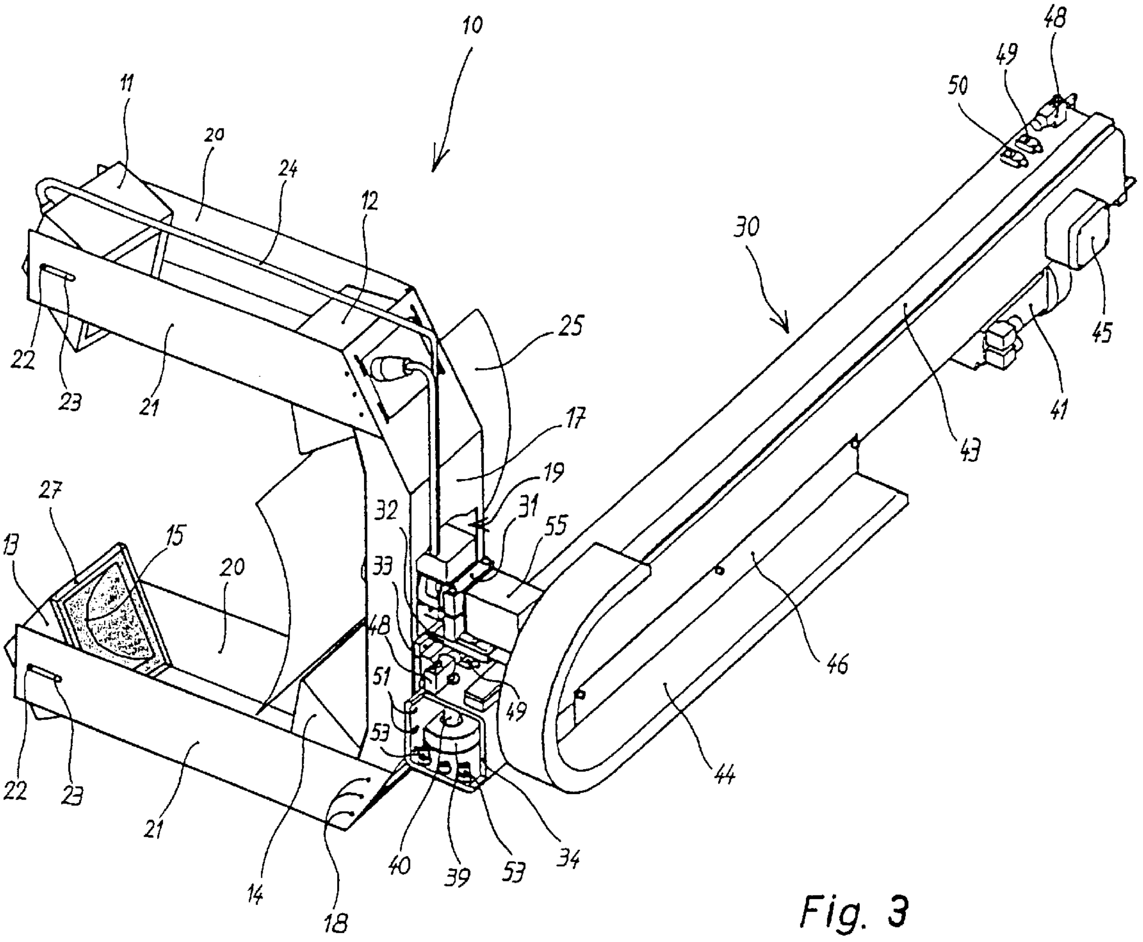

FIGS. 2 and 3 show just the printing fault detection device 1 in front and rear perspective respectively. This device comprises a lighting unit 10 across which is aimed the lens 56 of a video camera 55, and an arm 30 along which the camera and the lighting unit can move.

The illumination required for photographing each image of the strip comprises four flashlights 11, 12, 13, 14 which include two flashlights 11 and 13 for indirect illumination, and two flashlights 12, 14 directly illuminating the surface of the strip and the light of which is intended mainly for diffusion in every direction by the non-metallised surfaces of the strip 3. Each of these flashlights has a reflector 15 of substantially parabolic shape, the curvature of which enables the illumination to be concentrated to the maximum on the zone covered by the largest field of view 7 of the lens 56. A column 17 formed from a metal sheet bent slightly at its ends and reinforced laterally along its major sides forms the main support for the complete lighting unit 10. The two flashlights 12 and 14 intended for direct illumination are screwed at these ends, as are also two mountings each formed by two trapezoidal metal plates 20 and 21 connected to the column 17 by fixing screws 18. The two flashlights 11 and 13 required for indirect illumination are held between each of these pairs of plates 20 and 21 and at the end thereof. The flashlights 11 and 13 can be controlled, in a given travel, both in respect of the distance separating them from the column 17 and in respect of their inclination, by means of a readily adjustable fixing means in the form of a screw 22 and a slot 23 machined horizontally at the end of each of the plates 20 and 21.

The central part of the column 17 comprises an opening 19 in which the lens 56 of the video camera 55 slides. This lens has a focal length that can be varied continuously and which is the only changeable parameter on this camera. Fixed in front of the lens is a semi-transparent filter 57 inclined at an angle of 26° to the vertical plane in the direction of the flashlight 13 giving the lower indirect illumination. The value of the angle of inclination of this semi-transparent filter can be changed in a range between 20° and 30°. In front of the semi-transparent filter is an opaque diffuser 25 of concave rectangular shape disposed vertically facing the metallised strip 3. A sleeve 26 enables the mechanical and optical connection to be made between the concave diffuser 25 and the camera lens 56. This sleeve in fact on the one hand enables the semi-transparent filter 57 to be so contained that it is never in front of the diffuser while on the other hand the sleeve has a circular shape in its upper part while it is funnel-shaped in its bottom part. As a result, it forms an optimum light guide which is light-tight, allowing for the inclined position of the semi-transparent filter. A translucent flat diffuser 27 is disposed directly in front of the bottom flash light 13.

Figure 4:
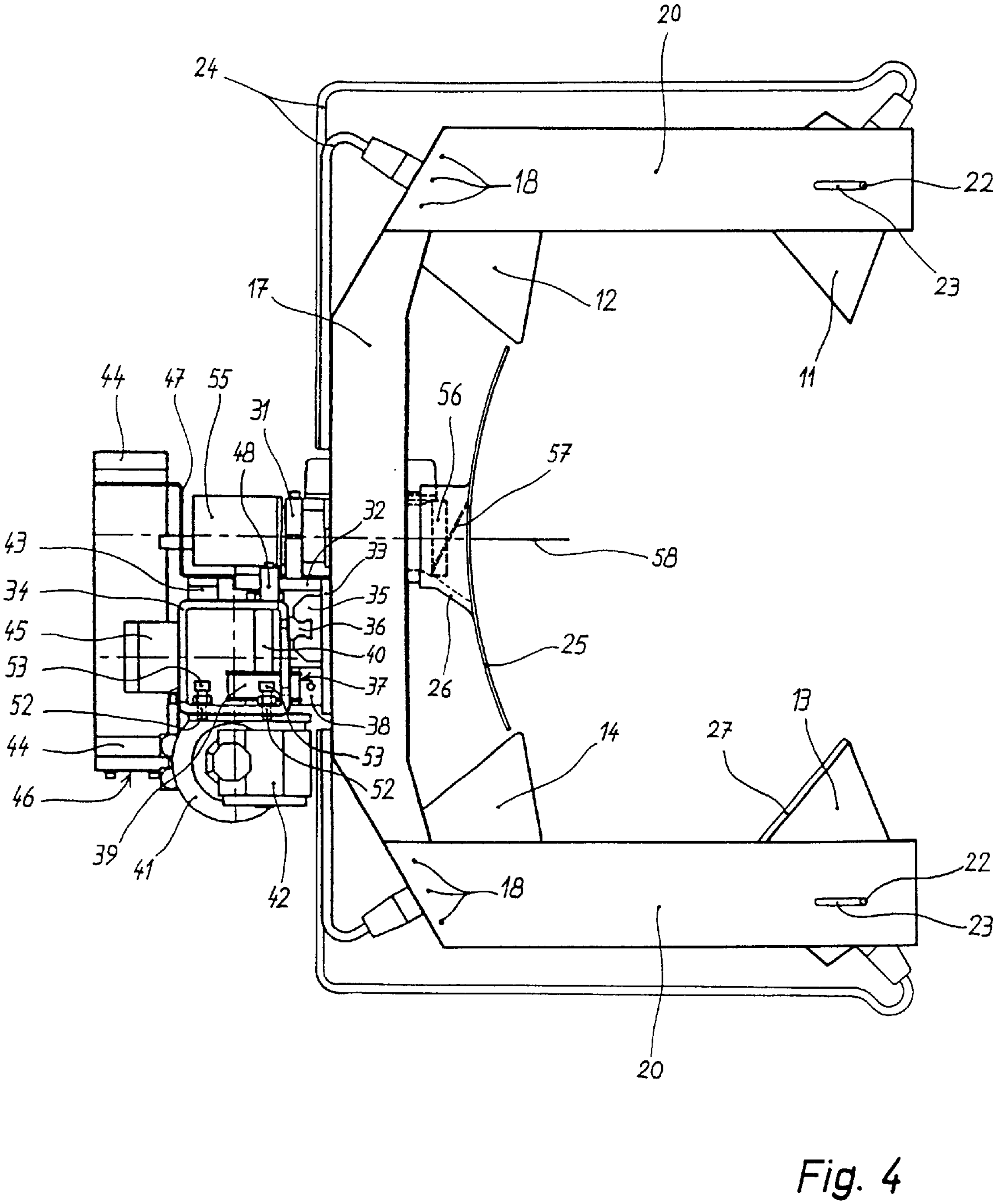
FIG. 4 shows the detection system removed from its casing in a profile view seen from the end on the side remote from the operator.

As will be clearer from FIG. 4, the camera 55 is connected to the lighting unit 10 by a flange 31, a support plate 32 and a fixing plate 33. The flange 31 holds the camera 55 rigidly on the support plate 32. The latter is fixed perpendicularly at the end of a fixing plate 33 which is in turn screwed into the back of the column 17 so that the axis 58 of the camera lens coincides with the axis of symmetry of the lighting unit 10. A square-section metal profile forms the body 34 of the arm 30 along which the lighting unit 10 and the camera 55 connected thereto can move. For this purpose, a slider 35 in the form of a claw slides freely on a profiled rail 36 fixed horizontally facing the lighting unit 10, against the outer front surface of the body 34. The back of the slider 35 is screwed against the fixing plate 33 so that the lighting unit assembly 10 can slide along the rail 36.

The movement of the lighting unit is actuated by rotation of a belt 37 clamped by a flange 38 connected to the fixing plate 33. The belt 37 is disposed parallel to the body 34 and runs over two pulleys 39 joined to vertical shafts 40. These shafts 40, which are held so as to be freely rotatable at the ends of the arm 30, are disposed inside the body 34 so that a part of each pulley 39 partially emerges from the body 34 through an opening formed in the front surface thereof beneath the rail 36. An electric motor 41 is fixed beneath the body 34 near one of its ends. This motor drives one of the two pulleys 39 through the agency of a transmission unit 42 enabling the horizontal rotary movement of the motor shaft 41 to be converted, conventionally by the engagement of various gearwheels, into a vertical rotary movement driving the shaft 40 of the pulley 39. The transmission unit 42 is held beneath the body 34 of the arm 30 by screws.

The distribution of electric power to the complete system is provided by cables housed in a duct 43 fixed to the top surface of the body 34, and by an articulated duct 44 folded on to itself, and which supplies the camera 55 and the four flashlights 11, 12, 13, 14 by means of cables 24. The bottom horizontal part of the articulated duct 44 is supported by a metal sheet 46 bent at a right angle and fixed to the base of the rear surface of the body 34. The top end of the articulated duct 44 is in turn supported by a smaller metal sheet 47 folded "stepwise" and fixed against the rear edge of the support plate 32. Situated on the same side as the motor 41 at the end of the rear surface of the body 34 a power supply unit 45 provides the connection to the mains.

On the top surface of the body 34 and at each end an abutment stop 48 is provided with a rubberised head against which the side edge of the support plate 32 can abut. Near the inner sides of each of these abutments a sensor 49 enables the end of the travel of the movable lighting unit 10 along the arm 30 to be detected on either side. Connected to the motor 41 these sensors 49 enable the power supply to the latter to be broken whenever the lighting unit 10 meets one or other of the ends of the arm 30. Situated between the sensors 49 at one of the ends of the arm 30 a last sensor 50 enables the device to locate the operator side from the side remote from the operator side, by displacement up to the end of travel of the lighting unit 10 in an initialisation phase. Each of the ends of the body 34 is drilled with two holes 51 in the leading front surface and two holes 52 in the lower surface. These holes allow the passage of two screws 53 intended for fixing the arm 30 on horizontal bars 67 or vertical bars 66 of the structure of the casing 2, depending on whether the camera 55 is to be used horizontally or vertically.

Figure 5:
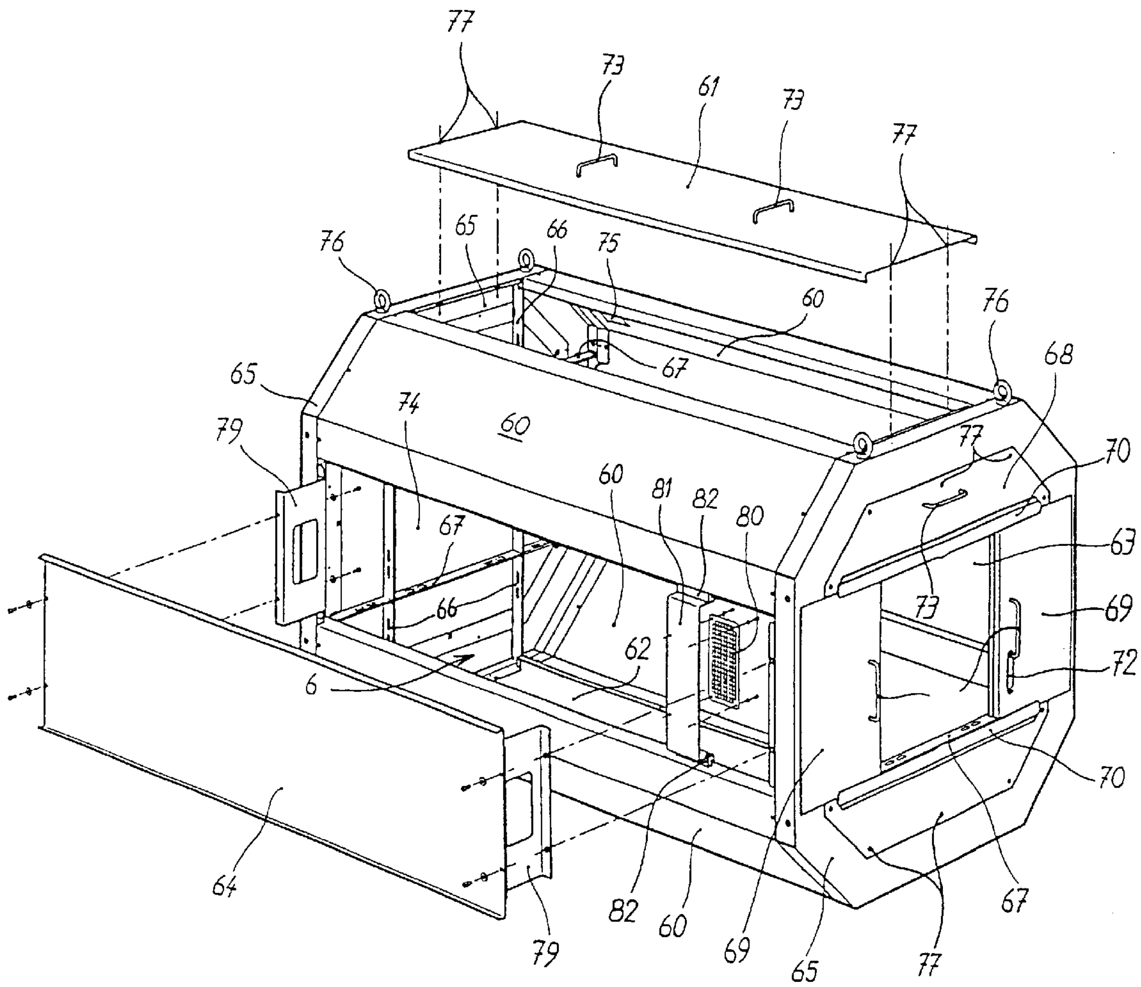
FIG. 5 is a perspective view of the casing without the printing fault detection system.

FIG. 5 is a perspective view of the casing 2 without the printing fault detection device 1. Of straight prismatic shape with an octagonal base this casing is made up of various metal sheets forming its longest walls, and these include four metal sheets 60 which are fixed-angle sheets, and four other sheets that can be readily removed and which are a top cover 61, a bottom cover 62, a rear cover 63 and a vertical screen sheet 64 disposed in front of the casing. The side walls of the casing 2 are formed by two lateral frames 65 of octagonal shape and between the sides of each of which there are uniformly disposed and fixed the vertical metal bars 66 which are welded and interspersed with the horizontal metal bars 67. Each of these bars is uniformly drilled with oblong holes enabling the device 1 to be fixed by means of the screws 53 of the arm 30. The two frames 65, the bars 66 and 67, and the four angled sheets 60 form the rigid structure of the casing 2. On the operator side, the side wall of the casing is closed by a cover 68 provided with two sliding doors 69 which move horizontally between two guides 70 screwed on the cover 68. The sliding doors 69 are each provided with a handle 71 and can be kept closed by a retractable hook 72 which is freely rotatable at the end of one of the two handles 71. Other handles 73 are provided on the covers 61 and 68 and on a cover 74, without any doors, which is intended to close the side wall of the casing 2 on the side remote from the operator. At the back of the casing, a small rectangular opening cut in the angled sheet 60 and covered by a plate 75 provides the passage for the cables required for the power supply. On the top part of the casing 2, four lifting rings 76 are bolted on the upper flanks of the lateral frames 65 so that the casing can be readily moved while remaining balanced. The screen sheet 64 and the covers 61, 62, 63, 68 and 74 are provided with a simple quick-closure system based on a quarter-turn rotation of a number of locking screws 77.

Figure 6:
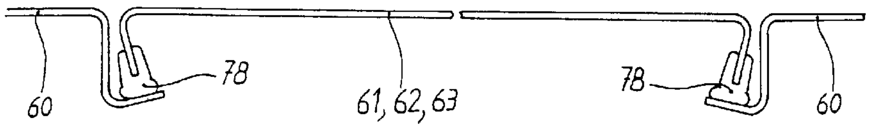
FIG. 6 is a plan view in partial section of the assembly of three adjacent metal sheets forming the casing envelope.

FIG. 6 shows the fitting of three adjacent sheets forming the envelope of the casing 2, i.e. the fitting of the covers 61, 62 or 63 to the angled sheets 60. The edges of the latter, which are bent to be S or Z shaped, serve as supports for the inwardly bent edges of the adjacent sheets. Gaskets 78 clipped on the bent edges of the covers provide light-tightness.

The screen sheet 64 is mounted by its ends on two supports 79 (FIG. 5) which are in turn fixed on the front vertical edges of the side frames 65. As will be clearer from FIG. 1, the arrangement of the screen sheet is such that the strip 3 moves in front of the window 6 between the lighting unit 10 and the screen sheet 64. The latter, the size of which is identical to that of the window 6, can also be used as a cover fitting in the opening formed by the window 6, thus advantageously converting the casing into a case which will be useful for transport. Disposed vertically between the edges of the two angled sheets 60 defining the opening of the window 6 a target 80 formed by a precision rastered plate is screwed on a target support 81. The latter comprises a metal sheet bent at right angles at its ends thus forming two lugs provided with two rectangular rubber studs 82 screwed on their outer surface. Cut with a longitudinal slot and slid between the edges of the two fixed angle sheets 60, the studs 82 enable the target support 81 to be held while allowing positioning anywhere on the length of the window 6. The target support 81 can be locked at a selected location by clamping by means of the screw in the slot of each of the studs.

To enable it to be automated, the printing fault detection device 1 is connected to two simultaneously operating interconnected computers. One of the computers processes each image taken by the camera in a very short time interval less than 300 ms, and the other computer controls the movements of the lighting unit, manages the illumination of the flashlights and by way of software provides interaction which is possible at any time between the operator, the detection system and the management of this system.

In order that the functionality of some of the elements forming the system described in this invention may be more readily understood, it would be advantageous to specify their respective roles more fully. From a purely optical aspect, the use of a semi-transparent filter disposed in front of the camera lens provides an advantageous application for the latter in the area of printing using reflecting substrates such as metallised strips. It is in fact by means of this semi-transparent filter that it is possible to place a light source virtually in front of the camera lens without masking its field of view. The light from the bottom indirect-illumination flashlight meets the semi-transparent filter at an angle such that the beam reflected by the filter prevents any reflection of the lens on the strip under examination. The light from the upper indirect-illumination flashlight has the main function of illuminating the concave opaque diffuser. This diffuser will send this light in every direction while concentrating the illumination, owing to its particular curvature, on the maximum format that it is possible to observe. It is in order to provide the best balance between the intensity and distribution of the indirect illumination meeting the metallised strip that only a translucent flat diffuser is disposed in front of the lower indirect illumination, since the beam of light emitted by the upper homologous illumination already meets the concave diffuser before being reflected in the direction of the metallised strip. The opaque concave diffuser is covered with a coat of paint which, on the one hand, thanks to its granular consistency, provides good incident light diffusion, and which on the other hand, thanks to its very white colour, absorbs only a minimum of light intensity. This paint also has the property of not turning yellow or fading with age, and also forms a readily washable surface in the event of soiling due to any sputtering.

The camera lens enables photographs to be taken up to a format close to the size of an A4 sheet. In the case of large enlargements of the strip image, it is advantageous to apply a greater light intensity. This light application, controlled by the operator, is effected by increasing the illuminating power of the flashlights, which can be adjusted independently depending on their function. The fault detection principle inter alia makes use of the properties of a CCD camera which enables the image obtained from the metallised strip to be in the form of an image made up of a plurality of pixels. Each pixel has a certain brightness transcribed as a certain grey level represented on a scale ranging from black to white and enabling the contrast gradation to be defined. The camera enables the intensity of a colour to be quantified by breaking down the colour into the three primary colours, and enables this intensity to be interpreted in the scale of grey levels. Detection of a fault is effected by comparing the grey level of a pixel of an image of the strip with the grey level of the same pixel of another image stored in a memory and required a priori to be identical to the first image. A certain tolerance defined by the operator is applied to the variation in the grey level found between the two images for one and the same pixel. This tolerance enables normal admissible variations in the strip inking to be taken into account so that they are not interpreted as being the finding of a fault.

Three different faults may be detected in the monitoring of a flat strip. There may be a register fault along the X-axis parallel to the strip width, a register fault along the Y-axis perpendicular to the X-axis, or a print quality fault independent of the previous two faults. As the strip moves it must be assumed that it is subject to slight lateral oscillation along the X-axis. Similarly, slight shifts in the longitudinal direction along the Y-axis may occur as a result of slight changes in the strip tension, for example. These variations, both X and Y, must be considered as normal and must therefore be capable of differentiation from an unacceptable deviation or an inadmissible cumulation of variations which of themselves are very small. However, such variations may involve extreme jumps in the grey level of one and the same pixel, even though the camera has remained motionless during the monitoring of successive identical images. In fact, if the pixel in question is in a free part of the image, at the limit of two strongly or adequately contrasted zones, the variations in the register of the strip, compared with the size of a pixel, will then be sufficiently large for the latter to be able alternately to change grey level in synchronism with the oscillations of the strip. In order to prevent this balancing of the intensity of one and the same pixel between one image and another from being interpreted by the system operator as a fault, provision is made to store all the free contours of the image requiring to be monitored, and to add in register therewith a kind of virtual-contour band or filter having an enlarged contrast tolerance. Thus such jumps in the grey level for one and the same pixel will be hidden by this virtual mask and will not interfere with the fault detection process.

The procedure to be followed by the operator in order to obtain a process for starting the quality control with a device of this kind is as follows:

In a first stage devoted to preparing the machine in accordance with the required work, the operator will carry out various conventional adjustments and tests required to give a print of the required quality both in respect of register along the X and Y axes and in respect of the visual appearance of the printed pattern.

Once this first preparatory stage has been successfully completed, the camera will be calibrated by positioning it opposite the target specially provided for the purpose. This operation will enable the exact dimensions of the extent of different fields of view of the camera lens to be standardised. The camera will then be positioned opposite one of the patterns printed on the strip in order that the adjustments may be carried out for locking the camera on this pattern, and then selection of the zoom factor for this image and selection of the intensity of illuminating the strip as provided by the flashlights. The timing of the flashlights is synchronised with the frequency of movement of the patterns being monitored. This frequency depends on the size of the printed patterns and the adjustable speed of movement of the strip. At this stage the operator will obtain on his screen a good-quality image which will serve as the first reference image.

By means of the software controlling the detection system the operator will be able to see on the monitor screen a second image which theoretically should be identical to the first reference image. Due to the sensitivity of the system, certain "faults", or more specifically certain differences in the level of contrast of some of the pixels compared with the first reference image, will be logged and signalled as such by the control computer. The operator will have the choice of accepting or rejecting the quality presented by this second image. If the operator considers that the image in question shows faults such that it is not representative of a model image, he will reject this image and a new image will be presented. In the opposite case, in which the print quality is considered as good, the image in question will be stored in the computer memory and averaged to the first. Continuing with this procedure he will finally have a type image resulting from the mean of a certain sum of images taken as samples of sufficient quality. This type image will constitute the new reference image which will serve as a comparison base for the entire automated monitoring of the metallised strip. A certain tolerance defined by the operator is then applied during monitoring of the grey levels between this new reference image and the forthcoming images which are required to be monitored.

Automation of the monitoring process is based on acquisition of a certain number of samples of images of the strip taken in a sequence defined by the operator. In order that any incipient fault may be detected as quickly as possible, thus avoiding wastage as far as possible, it is preferable that the monitoring sequence selected should cover the entire width of the strip as quickly as possible. However, the operator is free to control or change at any time, either permanently or temporarily, the monitoring sequence. As soon as a fault has been detected, the camera will stop at the X-axis of the fault located so as to check whether this fault is repeated along the same axis in the few directly following prints. If that is the case, the monitor will conclude that an incipient fault has been detected which may worsen, and will immediately alert the operator.

For certain products, the metallised strip may be printed on both the front and back. In such cases, the front and back prints should be perfectly in register so as to eliminate any offset making the final product unusable. The location of a second casing opposite the first and provided with a similar system to monitor the back of the metallised strip may constitute an option for the system forming the subject of this patent application. The provision of an option of this kind has the advantage of providing a plurality of different lighting combinations from one another while providing, specifically depending on the type of strip used, the best examples of quality in respect of the required colour rendering. For example, in the case of monitoring a transparent strip, experience has shown that it is particularly advantageous to use the camera and the two direct-illumination flashlights of the first device disposed at the front of the strip, and the concave opaque diffuser provided with the semi-transparent filter and the two indirect-illumination flashlights of the second device situated at the back of the strip. The direct illumination would then be given by the first device at the back of the strip and the indirect illumination by the second device synchronised with the first.

The use of a single lighting system for monitoring transparent strips, however, does give rise to a projection problem of shadow carried by the printed patterns on the screen sheet at the rear of the strip. This problem is due to the combination of the non-perpendicular illumination of the printed patterns with the distance between the screen sheet and the transparent strip. As a result of this, the monitoring screen gives a multiple display of the strip patterns. In order to remedy this problem, the device according to this patent application may be equipped, instead of with the screen sheet, with a perfectly diffuse luminous surface which is homogeneous over its entire height and throughout its length. This luminous surface is powered by a flashlight operating in synchronism with the flashlights of the device.

It should finally be noted that the different types of symmetry given by the geometry of the casing in which the device is housed provides welcome freedom both in respect of positioning and fixing in a printing press, and thus contribute to the accessibility of different variants which are possible on installation. Numerous improvements may be made to this device within the scope of the claims.

What is claimed is:

1. An automatic system (1) for detecting printing faults on metallised strips (3) or any other printing support comprising a predominance of specular colour surfaces, characterised in that the said system, arranged in a blackout casing (2), comprises an arm (30) on which there can move automatically a lighting unit (10) provided with a video camera (55) having a variable-focus lens (56) which, through a semi-transparent filter (57) disposed in an oblique position in front of the lens, continuously films a portion of the strip (3) of a format (7) of variable size, and in that the illumination of this strip portion is provided by two direct-illumination flashlights (12, 14), provided primarily to illuminate the non-specular surfaces of the strip, and by two other indirect-illumination flashlights (11, 13), advantageously provided to illuminate the specular colour surfaces, one of the two flashlights (11, 13) comprising a translucent flat diffuser (27) disposed on its leading front surface and oriented preferentially in the direction of the semi-transparent filter (57), while the other flashlight (11) is oriented in the direction of the surface of a concave and opaque diffuser (25) enclosing the semi-transparent filter (57), and which is mounted at its centre on a sleeve (26) which provides the mechanical and optical connection between the diffuser (25) and the lens (56) of the camera (55).

2. A system according to claim 1, characterised in that the lighting unit (10) has as its central part a column (17) formed with an opening (19) in which the lens (56) of axis (58) of the video camera (55) will slide, the two direct-illumination flashlights (12, 14) being fixed and located at the ends of the said column (17) and on the side flanks of each of the flashlights there are screwed, in front of the column (17), a pair of plates (20, 21) which form the arms of a mounting for each of the indirect-illumination flashlights (11, 13), which are fixed there at their ends by a simple and adjustable fixing device formed by a screw (22) extending through a slot (23) cut in each of the plates (20, 21) so that each of the flashlights (11) and (13) can be finely adjusted both along its mounting and in respect of its inclination, and in that each of the flashlights (11, 12, 13, 14) is equipped with a reflector (15) of substantially parabolic shape, and produces flashes the timing of which is in synchronism with the frequency of movement of the patterns printed on the strip being monitored.

3. A system according to claim 1, characterised in that the opaque diffuser (25) has a concave shape with a curvature such as to diffuse and return the rays from the two flashlights (11, 13) by concentrating this illumination to the maximum on the zone covered by the largest field of view (7) that the lens (56) can provide, the said diffuser (25) is covered with a coat of paint which on the one hand, thanks to its granular consistency, allows good diffusion of the incident light and which, on the other hand, thanks to its very white colour, absorbs only a minimum of luminous intensity, and said coating also has the properties of not turning yellow or fading with age and forms a readily washable surface, the said diffuser (25) comprises in its central part an opening accepting the sleeve (26) which allows the semi-transparent filter (57) to be so contained that it is never situated in front of the diffuser, and in that the said sleeve (26) has at one of its ends a circular shape in its upper half and a funnel shape in its lower half so as to allow in optimum manner for the incidence and the function of each of the beams of light from the two indirect-illumination flashlights (11, 13) taking into account the inclined position occupied by the semi-transparent filter (57) in the sleeve (26).

4. A system according to claim 1, characterised in that the semi-transparent filter (57) has the feature of being both translucent for a majority proportion of the rays of light and of reflecting the minority proportion irrespective of the angle of incidence at which the beam in question meets its surface inclined in the direction of the flashlight (13) by an angle of 26° to the plane of the camera lens so that the beam of light emitted by the latter meets the semi-transparent filter (57) which partly returns it in the direction of the strip (3) before the bright surface of the strip (3) reflects it in a direction such that this latter specular reflection can for the major part traverse the semi-transparent filter (57) and reach the lens (56) of the camera (55), and in that the value of the angle of inclination of the said semi-transparent filter (57) can be adjusted in a range between 20° and 30° by a simple mechanism which can be automated.

5. A system according to claim 2, characterised in that the column (17) is also equipped with a fixing plate (33) screwed in the back of said column beneath the axis (58) also defining its median plane, which holds a support plate (32) screwed perpendicularly at one of its ends, said latter plate (32) in turn supporting the camera (55) which is held rigidly by means of a fixing flange (31), and a small metal sheet (47) bent in the form of a step and fixed against the rear edge of the plate (32) and serving as a support for the upper part of an articulated duct (44) bent on itself, and in that also fixed on the said fixing plate (33) are, on the one hand, a claw-shaped slider (35) and, on the other hand, a flange (38) screwed beneath the latter.

6. A system according to claim 1, characterised in that the arm (30) is formed by a body (34) constituted by a square-section metal profile comprising, on the one hand, in its ends, two holes (51) and two holes (52) respectively drilled in its front surface and its lower surface to allow the passage of two screws (53) intended for fixing the arm (30) on horizontal bars (67) or vertical bars (66) of the structure of the casing (2), and on the other hand comprising a profiled rail (36) fixed horizontally on its front surface and along which the slider (35) can slide freely, and in that a metal sheet (46) bent at right angles is fixed on the rear surface of said body (34) to hold the lower part of the articulated duct (44) and inside said body (34) are two shafts (40) mounted to rotate freely and disposed in its ends parallel to the front surface of the body (34) situated opposite the fixing plate (33) so that a part of two pulleys (39) each connected to one of the shafts (40) required for linear displacement of the lighting unit (10) partially emerges from the body (34) through an opening cut in the said front surface thereof beneath the rail (36).

7. A system according to claim 6, characterised in that the linear displacement of the lighting unit (10) along the arm (30) is provided by the fixing of the flange (38) on a belt (37), by rotation of the latter around the two pulleys (39) both inside and outside the body (34) along the front surface thereof, and in that only one of the two shafts (40) is driven in rotation by a transmission unit (42) held beneath the body (34) and enabling the rotary movement of the shaft of a motor (41) also fixed beneath the body (34) to be converted, conventionally by the engagement of various gearwheels, into a perpendicular rotary movement driving the shaft (40) in question, and in that the body (34) of the arm (30) comprises at each of these ends an abutment stop (48) in front of which is positioned an end-of-travel sensor (49) and beside which, in the case of one of the two ends only, there is also fixed a direction sensor (50) which detects the direction of movement of the lighting unit (10), and in that the power supply for the various electric components is effected by cables (24) housed in a duct (43) fixed along the body (34), and in the articulated duct (44) capable of following the linear movements of the lighting unit (10).

8. A system according to claim 1, characterised in that the casing (2), of straight prismatic shape with an octagonal base, is formed by a structure comprising on the one hand for lateral surfaces two frames (65) between the edges of each of which there are uniformly disposed and fixed the vertical metal bars (66) welded and interspersed with the horizontal metal bars (67) each formed with a plurality of uniformly spaced oblong holes, and on the other hand comprising in the case of edges connecting the two side frames (65) of the said casing (2), four angled metal sheets (60) bent at 45° along their longest sides for the purpose of forming a rigidity edging in turn comprising a gutter in which the longitudinal edges of each of the covers (61, 62, 63) rest, said edges being bent over and terminating in a gasket (78), said covers forming the envelope of the casing (2), and in that one of the sheets (60) comprises a small opening closed by a plate (75) intended for the passage of the cables (24) required to provide the system (1) with electrical energy.

9. A system according to claim 8, characterised in that four lifting rings (76) are bolted on the upper flanks of the side frames (65) one of which is covered with a cover (74) having no doors, and the other, remote from the first, is covered by a cover (68) comprising two sliding doors (69) which slide horizontally between two guides (70) screwed on the cover (68) and each equipped with a handle (71) and being adapted to be kept closed by means of a retractable hook (72) which is kept free in rotation at the end of one of the two handles (71), and in that other handles (73) are provided for the covers (61, 68, 74).

10. A system according to claim 8, characterised in that remote from the cover (63) there is a wide opening (6) formed by the withdrawal of a screen sheet (64) identical to the cover (63) and through which is aimed the lens (56) of the camera (55) viewing the strip (3) which moves outside the casing (2) over two rollers (4, 5) disposed opposite said window (6) between the longitudinal edges of which are slid two rubber studs (82) screwed on each of the two right-angled feet of a narrow rectangular sheet (81) serving as a support for a target (80) formed by a precision-rastered plate, and in that the screen sheet (64) is held in front of the window (6) behind the strip (3) by its ends on two supports (79) fixed on the front vertical edges of the side frames (65), said screen sheet (64) and the said covers (61, 62, 63, 68, 74) are all provided with a simple quick-closure system based on a quarter-turn rotation of a plurality of locking screws (77).

* * * * *